Dec. 13, 1955     E. BRICHARD     2,726,486
PROCESS OF AND APPARATUS FOR DRAWING GLASS
Original Filed Aug. 4, 1949

INVENTOR
EDGARD BRICHARD

BY George H. Corey
ATTORNEY

United States Patent Office 2,726,486
Patented Dec. 13, 1955

2,726,486

PROCESS OF AND APPARATUS FOR DRAWING GLASS

Edgard Brichard, Jumet, Belgium, assignor to Union des Verreries Mecaniques Belges S. A., Charleroi, Belgium, a company of Belgium Original application August 4, 1949, Serial No. 108,452, now Patent No. 2,693,052, dated November 2, 1954. Divided and this application September 17, 1954, Serial No. 456,789

Claims priority, application Belgium May 17, 1949

5 Claims. (Cl. 49—17)

This invention relates to the vertical drawing of sheet glass from a bath of molten glass and is directed to the provision of a process and apparatus for producing drawn glass in sheet form of generally improved appearance.

This application is a division of my copending application Serial No. 108,452, filed August 4, 1949, now Patent No. 2,693,052.

It is known that movement of relatively cold air along and in contact with the surfaces of the glass sheet while they still remain plastic, and with surfaces of the bulb that normally forms at the foot of the glass sheet as it is drawn from the molten glass bath, produces modifications in the characteristics of the glass which impair the final appearance of the glass surface.

In the drawing of sheet glass by the vertical drawing process a zone of reduced pressure tends to form in the gaseous atmosphere surrounding the foot of the freshly formed glass sheet and the adjacent bulb surfaces. This is due to the fact that the gases coming in contact with the hot sheet of glass are heated thereby and rise along both faces of the glass sheet. The upward flow is also aided by movement of the glass sheet. As a result of the above action relatively cool gases present in the portions of the drawing chamber that are more remote from the bulb and the highly heated surfaces of the glass sheet are caused to flow towards the bulb and the foot of the glass sheet. In addition cold air enters the drawing chamber from the outside through cracks and access openings which cannot be entirely sealed. Usually coolers are also positioned at the opposite sides of the ascending glass sheet to absorb heat radiated therefrom and promote solidifying of the glass sheet. These coolers also set up convection currents in the gaseous atmosphere surrounding them with the result that a relatively cool air current may move from the vicinity of the coolers toward the zone of reduced pressure adjacent the foot of the glass sheet. Due to the thermosiphoning action above described, the relatively cold air and gases are drawn inwardly towards the bulb and tend to come into contact with the bulb and the portions of the glass sheet adjacent the bulb while the glass sheet is still in a plastic form with the result that undesirable striations are formed in the surfaces of the finished sheet and other harmful effects are produced.

The problem is one peculiar to the vertical drawing of the glass as contrasted to horizontal drawing since only in the former process is the glass sheet drawn upwardly from the drawing chamber through a long vertically extending leer in communication therewith, and which, because of its vertical extent and direct communication with the drawing chamber, creates a chimney or draft effect along the sides of the newly formed glass sheet. In contrast, in the horizontal process the glass sheet is bent over a roller while still plastic. The contact with the roller alters the sheet far more than air currents would do, and consequently the horizontal process does not lend itself to the production of sheet glass having a high degree of freedom from surface imperfections. In the horizontal process the drawing chamber is generally open at both ends with no attempt made to control the inlet of cold air. This is in marked contrast to the vertical drawing process wherein it is sought to eliminate as far as possible the entry of any air from outside the drawing chamber and to avoid contact of cold air with the surfaces of the glass sheet while they remain plastic.

Efforts have been made to deflect these harmful relatively cold air currents by producing other currents whose effect on the sheet is less harmful but the results of such measures as heretofore proposed have never been perfect since harmful currents of air always remain in the vicinity of the bulb and the adjacent plastic surfaces of the freshly formed glass sheet. An attempt has also been made to protect the sheet from the harmful currents by means of barriers but for operational purposes it is impossible to make such barriers continuous with the result that the influx of air currents is concentrated at the gaps in the barriers which increases the harmful effects at these particular points.

The present invention has for an object to produce sheet glass by the vertical drawing process that is free from surface striations and has a generally improved surface appearance.

It is a further object of the invention to prevent harmful currents of air from coming into contact with the bulb and the adjacent plastic surfaces of the glass sheet.

It is a still further object to reduce the amount of heat required to be supplied to the glass bath to maintain a satisfactory drawing operation.

According to the present invention harmful currents of air are prevented from coming into contact with the bulb and the adjacent plastic surfaces of the glass sheet by altering the normal pressure relationships in the drawing chamber. More specifically, I have found that the tendency for cold air currents to be brought into contact with the bulb and adjacent plastic surfaces of the glass sheet can be overcome by bringing about a reduction in the pressure of the atmosphere present in the drawing chamber in zones thereof spaced laterally with respect to the bulb and the glass sheet and adjacent the bath surface at least sufficient to balance any reduction in the pressure in the inner zone immediately adjacent the bulb and the base of the sheet caused by the tendency of the gases in contact therewith and immediately adjacent thereto to rise as they become heated. Preferably the reduction of the pressure in the laterally spaced zones will be somewhat greater than the pressure reduction in the zones immediately adjacent the bulb and the adjoining portions of the glass sheet so that the normal tendency for an upward flow of air in contact with the side surfaces of the rising sheet of glass will be reversed.

As more particularly hereinafter described, I bring about the desired reduction in pressure by providing suitably apertured conduits or pipes extending along the sides of the glass sheet in laterally spaced relation thereto and at a level adjacent but spaced from the surfaces of the molten glass bath and applying suction thereto through connection of the pipes with an appropriate suction means.

The invention will be more fully understood by reference to the drawings, the accompanying detailed description and the appended claims.

Figures 1, 2:
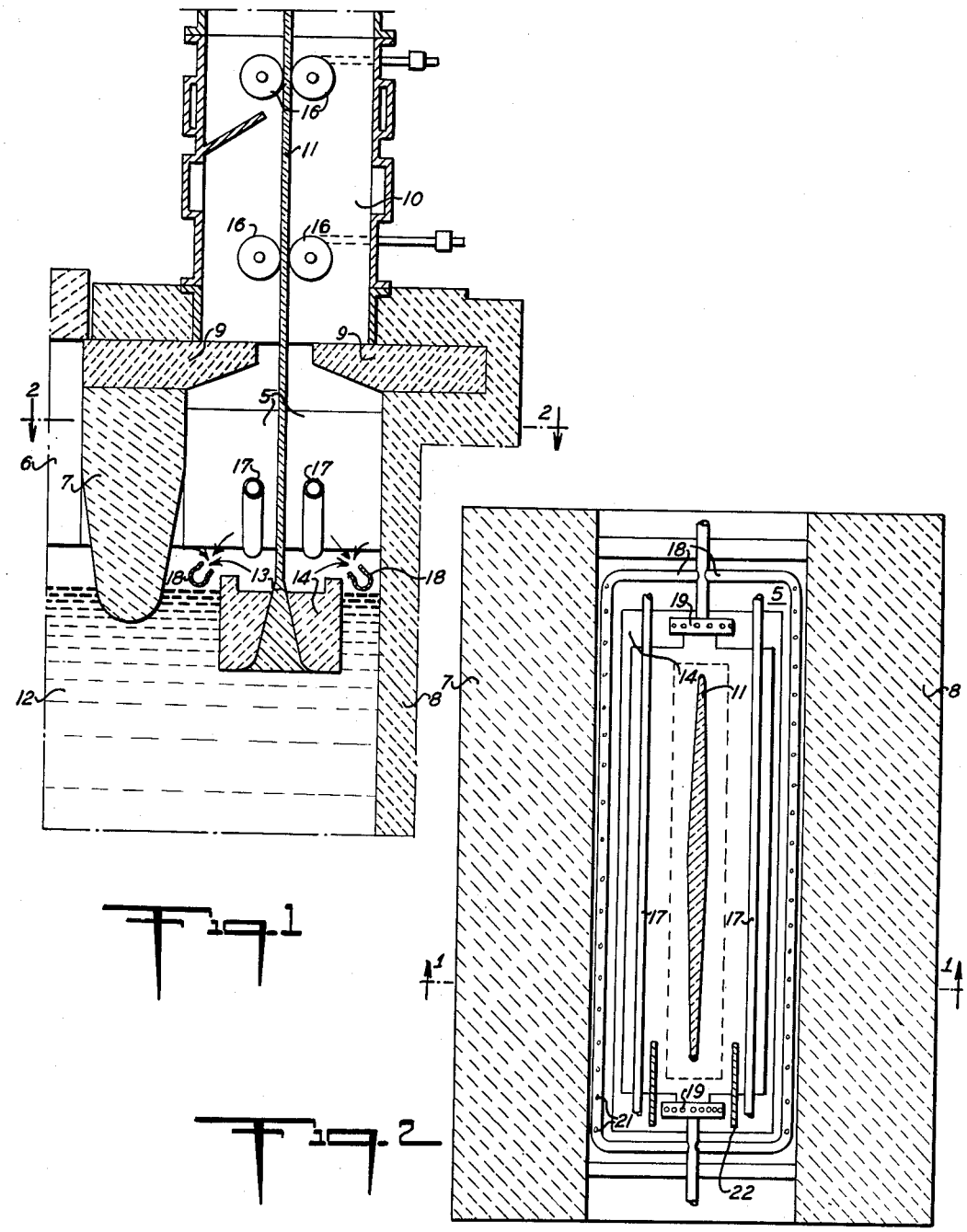
Fig. 1 is a vertical section taken along line 1—1 of Fig. 2.
Fig. 2 is a horizontal section taken alone line 2—2 of Fig. 1.

The invention is shown by way of example as being carried out with the use of a sheet forming block or debiteuse which is located at the surface of the glass bath; that is to say, as applied to the practice known in the art as the Foucault process. However, it will be readily appreciated that the invention is equally applicable to the Pittsburgh process wherein the glass is drawn into a sheet with the use of a submerged draw bar.

The drawing chamber 5 is insulated from the furnace atmosphere 6 by a partition 7 of a refractory material. The other side wall 8 of the chamber forms the end wall of the furnace. A pair of refractory elements 9 tend to isolate the drawing chamber proper from the superimposed vertically extending cooling chamber or leer 10.

The glass sheet 11 is formed from the bath of molten glass 12 through a forming bulb 13 defined within a drawing frame or block 14 of refractory material positioned in the drawing chamber. The glass sheet 11 is drawn upwardly through the vertical chamber 10 by a series of rollers 16 which are positioned at a point along the sheet where it has become solid. Cooling tubes 17 are shown on both sides of the sheet at points spaced above the drawing block and outwardly from the sheet for absorbing heat radiating from the glass sheet and accelerating the cooling thereof to the solid state.

A pipe 18 is positioned along each side of the sheet near the level of the bulb but spaced laterally therefrom and generally parallel thereto. A pair of end pipes 19 are similarly spaced from the ends of the bulb. All the pipes 18 and 19 have small openings that extend along the length of the pipe. These may be individual spaced apertures 21 as shown in the drawings or may consist of a narrow slot or slots. As shown only on one end of Fig. 2, screens 22 may be provided adjacent the ends of the glass sheet to avoid setting up of conflicting air currents in this area.

The pipes 18 and 19 are connected to an external source of suction, not shown. If desired, the air, or other gases removed in this manner may be returned to some portion of the drawing chamber or the cooling chamber where contact with the drawn glass sheet will not be harmful. The end pipes 19 may be omitted without greatly reducing the desired effects since only a relatively small surface area of the glass sheet is affected thereby.

Sufficient suction is applied through the pipes 18 and 19 so that the pressure of the gaseous atmosphere in the immediate vicinity of the pipes will be at least as low as the pressure immediately adjacent the base of the bulb and will, therefore, cause the air from the base of the bulb to move laterally toward and into the suction pipes. This in turn will cause a current of air to move downwardly along each surface of the glass sheet as shown by the arrows in Fig. 1. The movement of this hot air downwardly along the sheet does not in any way impair the surface of the sheet.

Although it is preferable to create enough suction in the pipes so that the normal upwardly-moving air currents along the surface of the sheet are reversed, it is sufficient if the lowered pressure at the suction pipes is just enough to eliminate the entry of cold air into the zone immediately adjacent the base of the glass sheet around the bulb. In other words, rising warm air currents or the absence of air currents does not impair the surface of the sheet.

I claim:

1. A process for the vertical drawing of glass in sheet form from a heated bath of molten glass including drawing the glass from the surface of the bath upwardly through a drawing chamber immediately above said bath and simultaneously withdrawing air from said drawing chamber at points adjacent the bath surface and spaced from the base of the glass sheet at a rate sufficient to maintain the pressure in an outer zone adjacent said points at least as low as the pressure in an inner zone immediately adjacent the base of the sheet to prevent air currents flowing toward said inner zone from said outer zone, said zones being in open communication.

2. A process for the vertical drawing of glass in sheet form from a heated bath of molten glass including drawing the glass from the surface of the bath upwardly through a drawing chamber immediately above said bath and simultaneously withdrawing air from said drawing chamber at points adjacent the bath surface and spaced from the base of the glass sheet at a rate sufficient to reduce the pressure in an outer zone adjacent said points of withdrawal below the pressure in an inner zone immediately adjacent the base of the sheet, said zones being in open communication so that the difference in the pressures tends to produce air currents flowing from said inner zone toward said outer zone.

3. A process for the vertical drawing of glass in sheet form from a heated bath of molten glass including drawing the glass from the surface of the bath upwardly through a drawing chamber immediately above said bath and simultaneously withdrawing air from said drawing chamber at points just above the bath surface and spaced from the base of the glass sheet along both sides and both ends of said sheet, said air withdrawal being at a rate sufficient to reduce the pressure in an outer zone adjacent said points below the pressure in an inner zone immediately adjacent the base of the sheet, said zones being in open communication so that the difference in pressure tends to produce air currents flowing away from said inner zone toward said outer zone.

4. Apparatus for drawing glass in sheet form from a heated bath of molten glass comprising a drawing chamber immediately above the bath surface, a vertically extending cooling chamber positioned above said drawing chamber in communication therewith, means for drawing said glass sheet upwardly through said chambers, a pair of pipes within said drawing chamber extending generally horizontally in parallel relation to said sheet on the opposite sides thereof and spaced therefrom adjacent the bath surface, said pipes each having apertures formed in one side thereof, and means for applying suction to said pipes to draw air from said chamber through said apertures and create a low pressure zone about said pipes.

5. Apparatus for drawing glass in sheet form from a heated bath of molten glass comprising a drawing chamber immediately above the bath surface, a vertically extending cooling chamber positioned above said drawing chamber in communication therewith, cooling means in said drawing chamber, means for drawing said glass sheet upwardly through said drawing chamber, a first pair of pipes within said drawing chamber extending generally horizontally in parallel relation to said sheet on opposite sides thereof and spaced therefrom adjacent the bath surface, a second pair of pipes within said drawing chamber extending at right angles to said sheet at the opposite edges thereof and in spaced relation thereto adjacent the bath surface, said pipes having apertures formed therein, and means for applying suction to said pipes to draw air from said chamber through said apertures and create a low pressure zone about said pipes.

References Cited in the file of this patent

UNITED STATES PATENTS

| | | |
|---|---|---|
| 1,816,037 | Zellers | July 28, 1931 |
| 2,287,136 | Rolland et al. | June 23, 1942 |
| 2,693,052 | Brichard | Nov. 2, 1954 |